United States Patent [19]

Sugiyama

[11] Patent Number: 5,089,889
[45] Date of Patent: Feb. 18, 1992

[54] APPARATUS FOR INTER-FRAME PREDICTIVE ENCODING OF VIDEO SIGNAL

[75] Inventor: Kenji Sugiyama, Noda, Japan

[73] Assignee: Victor Company of Japan, Ltd., Japan

[21] Appl. No.: 513,507

[22] Filed: Apr. 27, 1990

[30] Foreign Application Priority Data

Apr. 28, 1989 [JP] Japan .................................. 1-111301

[51] Int. Cl.⁵ .............................................. H04N 7/13
[52] U.S. Cl. ...................................... 358/135; 358/136
[58] Field of Search ................................ 358/136, 135

[56] References Cited

U.S. PATENT DOCUMENTS

| | | | |
|---|---|---|---|
| 4,651,207 | 3/1987 | Bergman et al. | 158/136 |
| 4,665,436 | 5/1987 | Osborne et al. | 358/136 |
| 4,691,233 | 9/1987 | Acampora | 358/136 |
| 4,700,226 | 10/1987 | Acampora | 358/136 X |
| 4,941,043 | 7/1990 | Jass | 358/136 |
| 4,969,040 | 11/1990 | Gharavi | 358/136 |

FOREIGN PATENT DOCUMENTS 244001 11/1987 European Pat. Off. .

OTHER PUBLICATIONS

CCITT SG15 RM6, Document 396, Oct. 1988.

*Primary Examiner*—Victor R. Kostak
*Attorney, Agent, or Firm*—Lowe, Price, LeBlanc & Becker

[57] ABSTRACT

An inter-frame predictive encoding apparatus which derives a prediction error signal representing successive frames of a video signal based on differences between pixel data of each frame and pixel data of at least one other frame, and executes intra-frame encoding of the prediction error signal, in which the prediction error signal is transferred through a spatial filter prior to intra-frame encoding, and in which the degree of filtering is controlled fixedly or varying in units of frame intervals by a control signal, for thereby controlling the high frequency components of the error signal to an appropriate level in accordance with respective requirements for the output data rate from the apparatus and spatial resolution of a finally obtained picture.

7 Claims, 4 Drawing Sheets

APPARATUS FOR INTER-FRAME PREDICTIVE ENCODING OF VIDEO SIGNAL

BACKGROUND OF THE INVENTION

1. Field of Application

The present invention relates to an apparatus for encoding a video signal to produce an encoded signal for transmission or recording, with the encoded signal containing substantially lower amounts of data than the original video signal. In particular, the invention relates to an apparatus for inter-frame predictive encoding of a video signal.

2. Prior Art Technology

Various methods have been proposed in the prior art for converting a digital video signal to a signal having a lower data rate, for example in order to reduce the bandwidth requirements of a communications link or to reduce the storage capacity required for recording the video signal. Such methods are used for example with moving-image video telephone systems. Basically, such methods can be divided into those which utilize the fact that there is generally a high degree of correlation between successive frames of a video signal, (this fact being used for example for interframe predictive encoding), those which utilize the fact that there is generally high correlation between each pixel of a frame and closely adjacent pixels on the same scanning line or on closely adjacent scanning lines (which fact is used for intra-frame or intra-field encoding in units of blocks of each frame or each field), and methods which use a combination of these two types of correlation. One method known in the prior art for using the generally close correlation between successive frames is to periodically transmit (i.e. at fixed numbers of frame intervals) certain frames, and to omit those frames which are intermediate between the transmitted frames, with the omitted frames being restored by interpolation at the receiving system, based on the information contained in the transmitted frames. Intra-frame block encoding of the transmitted frames may be executed prior to transmission, to further reduce the rate of data transmission. An example of such a method is described in U.S. Pat. No. 4,651,207, in which amounts of change between portions of each transmitted frame and the preceding transmitted frame are derived as motion vectors by the receiving system, and these motion vectors utilized for interpolating the omitted frames. If the movement within the picture that is conveyed by the video signal is comparatively simple then this may provide sufficient accuracy and a high degree of encoding efficiency. However if any substantial change in the picture contents occurs in the interval between two successive transmitted frames, then interpolation will be unsuccessful, so that such a method is of limited application. In addition, if any complex movement occurs in the picture in the interval between two successive transmitted frames, then again interpolation of the omitted frames will not be accurately achieved.

Another known method is to periodically utilize certain frames as reference frames, and to derive prediction error values with respect to a preceding reference frame, for each of the other frames prior to transmission. Here, "prediction error value" signifies an amount of difference between a (digital) value in the original video signal representing a pixel luminance (Y) or color difference (B−Y) or (R−Y) value and a corresponding value of the preceding reference frame. These reference frames, i.e. independent frames, are then encoded and transmitted, while only the prediction error values are encoded and transmitted for the remaining frames (i.e. dependent frames).

An example of a known method of prediction error encoding of a video signal is recursive inter-frame prediction error encoding. With that method, recursive derivation of prediction error values for each frame is executed based on accumulations of past prediction error values. Specifically, a set of prediction values held in a frame memory are successively subtracted from the data values of each frame to thereby obtain prediction error values for that frame, and the resultant prediction error values are encoded and transmitted. At the same time, decoding of the prediction error values is executed, in the same way as decoding at the receiving apparatus, and the recovered prediction error values are added to the corresponding ones of the prediction values that were used in obtaining them, then the results are stored in the frame memory for use as prediction values for the next frame of the video signal. Thus basically, only prediction error values are derived and transmitted with this method. At the receiving apparatus, each frame is recovered by superimposition of prediction error values. Such a recursive inter-frame predictive encoding apparatus is based on a closed loop, which supplies a prediction signal to be subtracted from the signal of the current frame of the input video signal.

Such a predictive encoding method utilizes only the correlation between successive frames of the video signal along the forward direction of the time axis, i.e. between each independent frame and a preceding independent frame. However there is of course similar correlation between each independent frame and the succeeding independent frame. A predictive encoding apparatus which makes use of this fact to enable more accurate predictive encoding operation, by using both the forward and reverse directions of the time axis, has been disclosed by the assignee of the present invention in U.S. Pat. No. 4,985,768, filed Jan. 18, 1990. The basic principles of such an encoding apparatus are illustrated in FIG. 1. Here, for each of the dependent frames 2, 3, 4 and 6, 7, 8, respective prediction error values are derived based on a combination of data values obtained from the preceding and succeeding independent frames, as indicated by the arrows. For example, inter-frame predictive encoding of frame 2 is executed based on the independent frames 1 and 5. This is also true for frames 3 and 4. More precisely, a first prediction signal for frame 2 is derived based on frame 1 as a reference frame, and a second prediction signal for frame 2 is derived based on frame 5 as a reference frame. These two prediction signals are then multiplied by respective weighting factors and combined to obtain a final prediction signal, (i.e. train of prediction values for frame 2) which is subtracted from the signal of frame 2 to obtain a corresponding prediction error signal. In this case greater weight is given to the first prediction signal (since frame 2 will have greater correlation with frame 1 than frame 5). Prediction signals for the other dependent frames are similarly derived. Since in this case correlation between a preceding independent frame and a succeeding independent frame is utilized to obtain prediction error values for each dependent frame, a substantially greater degree of accuracy of prediction is attained than with methods in which only inter-frame correlation along the forward direction of the time axis is utilized.

To increase the coding efficiency with each of such video signal encoding methods, intra-frame processing is also generally utilized, whereby both the data values of the independent frames and the prediction error values are subjected to orthogonal transform processing in units of blocks, to obtain coefficient values which are subjected to quantization, with the results then being encoded for transmission. Each block (e.g $8 \times 8$ array of values) may consist of a set of luminance values (corresponding to respective pixels) of an independent frame, or chrominance values of an independent frame, or may consist of a set of luminance or chrominance prediction error values (corresponding to respective pixels) of a dependent frame. The characteristics of such a predictive encoding system are basically determined by the block size and the quantization threshold level which determines the size of the quantization steps. The larger the block size, and the higher the quantization threshold level, the greater will be the encoding efficiency, i.e. the lower will be the data rate of the output signal produced from the encoding apparatus. More specifically, in the case of orthogonal transform processing and quantization of prediction error values, if the quantization step size is made relatively large. By using a large threshold level, small values of prediction error will be eliminated from being encoded and transmitted, with only relatively large amounts of prediction error being encoded. That is to say, the quantization operation is executed such that small value coefficients produced from the orthogonal transform processing are effectively reduced to zero in the encoded output signal. Since these small coefficients correspond to spatially small amounts of displacement (in the picture represented by the video signal) which are not visually conspicuous, the effects of eliminating these small coefficient values are not visually conspicuous in a television picture obtained by receiving and decoding such a transmitted encoded video signal. Thus, a small amount of displacement between a data value of a frame and a corresponding data value of a preceding frame will not be encoded as a prediction error value, and only when the magnitude of such an amount of displacement (prediction error) has accumulated to a relatively large value over a number of successive frames (i.e. as a result of continuing movement within the picture) will the predictive error become sufficiently large to be encoded after having been subjected to orthogonal transform conversion and quantized.

However the above methods of encoding a video signal to obtain an output signal having a lower data rate than that of the video signal have various disadvantages. Those methods in which only periodically selected frames are transmitted, with intermediate frames of the video signal being omitted, have been mentioned above. In the case of the recursive type of inter-frame predictive encoding, whereby only prediction error values are encoded and transmitted for each frame, the output data flow is irregular, so that it is necessary to transfer the output data through an output buffer. In practice it is necessary to provide some means for ensuring that the buffer will not overflow. In the prior art it has only been possible to control the data rate of the output encoded signal, to thereby prevent buffer overflow when necessary, by increasing the quantization threshold level. However this has the disadvantage of resulting in distortion of the contents of each block of the transmitted encoded data, if the increase in the quantization threshold level is large in relation to the optimum threshold level.

In the case of methods in which independent frames are periodically encoded and transmitted, with only prediction error values for each of the intermediate frames being derived based on the independent frames and encoded and transmitted, there is the disadvantage that most of the high-frequency components of the prediction error values (as represented in the encoded output signal) are encoded and transmitted. There is often only a low degree of correlation between the high frequency components of adjacent frames of a video signal, and in practice there is little loss in accuracy of recovery of the independent frames if these high frequency components are omitted from the prediction error values. However if low-pass filtering were to be utilized to eliminate these high frequency components, then since that filtering would also be applied to the independent frames, a loss of resolution would result in the image obtained by decoding an output signal transmitted from such a system.

Furthermore, for both the recursive type of inter-frame predictive encoding and the method in which only periodic independent frames and prediction error values derived based on these are encoded, due to the fact that the encoding characteristics will depend upon the orthogonal transform and quantization operations, it is very difficult to establish a balance between time axis resolution and spatial resolution. If the proportion of the prediction error values that are actually encoded (and transmitted) is reduced, e.g. by increasing the quantization level, thereby lowering the time axis resolution, the lower will become the spatial resolution (of the finally obtained reproduced picture).

There is therefore a requirement for an inter-frame predictive encoding apparatus whereby the high frequency components of the prediction error signal can be eliminated, without significantly reducing the resolution of an image obtained by decoding an output signal produced from the apparatus.

SUMMARY OF THE INVENTION

It is an objective of the present invention to overcome the disadvantages of the prior art as set out above, by providing an inter-frame predictive encoding apparatus for processing a prediction error signal, which includes a spatial filter whose characteristics are varied in a periodic manner with a period which is an integral number of frame intervals.

More specifically, according to a first aspect the present invention provides an improvement of an inter-frame predictive encoding apparatus for receiving a video signal formed of successive frames of pixel data, to derive, for each of the frames, a prediction error signal based on differences between pixel data of the frame and pixel data of at least one other frame, the improvement comprising:

spatial filter means for filtering the prediction error signal to alter a frequency characteristic thereof; and filter control means responsive to a filter degree control signal for varying a degree of the filtering.

According to a second aspect, the filter control means comprises means for controllably by-passing the spatial filter means in accordance with a level of the filter degree control signal.

According to a third aspect, the apparatus further comprises means for periodically varying the filter degree control signal with a period which is an integral number of frame intervals, for alternately establishing a first condition in which substantially no filtering is executed by the spatial filter means and a second condition in which a fixed degree of filtering is executed by the spatial filter means.

According to a fourth aspect, the filter degree control signal is preset to a fixed value which is selected to provide a desired output encoded data rate from the inter-frame predictive encoding apparatus.

DESCRIPTION OF PREFERRED EMBODIMENTS

Figure 2:
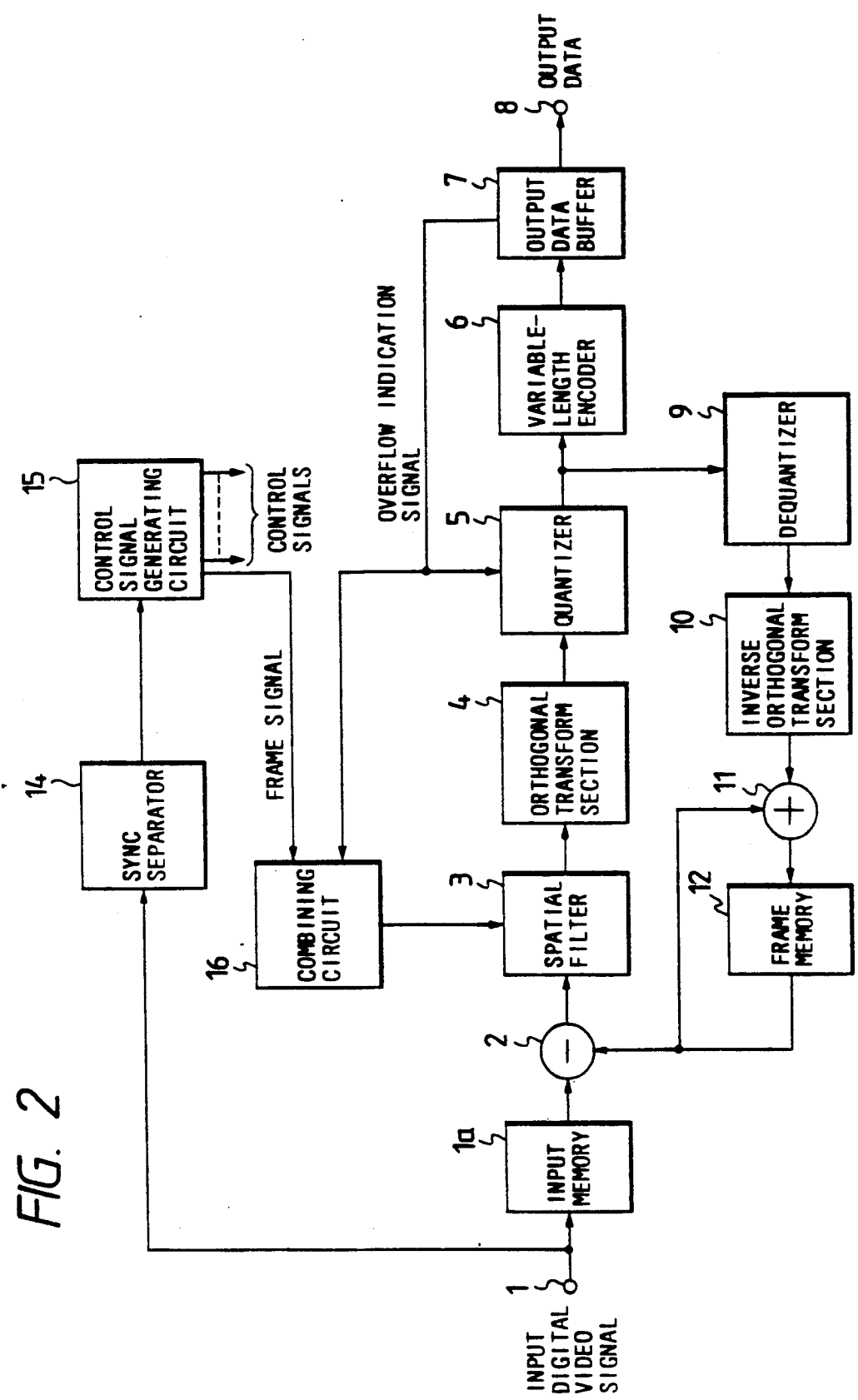
FIG. 2 is a general block diagram of a first embodiment of an inter-frame predictive encoding apparatus according to the present invention.

FIG. 2 is a block diagram of a first embodiment of an inter-frame predictive encoding apparatus according to the present invention. This is a recursive type of inter-frame predictive encoding apparatus, as mentioned hereinabove. A digital video signal is applied via an input terminal 1 to an input memory 1a, which has a capacity for storing a sufficient number of scanning lines of the video signal to permit successive blocks of data values (e.g. 8×8 blocks) corresponding to pixel luminance values or to color difference values, to be read out therefrom. The output data values from the input memory 1a are applied to one input of a subtractor 2, whose output data values are transferred as a prediction error signal through (also in units of block) a spatial filter 3, described in detail hereinafter. The output data values from the spatial filter 3 are then subjected to intra-frame encoding by an orthogonal transform section 4 in which they are converted to coefficient values, which are supplied to a quantizer 5 and quantized therein. The quantized output values from the quantizer 5 are then subjected to variable-length encoding by a variable-length encoder 6, and the encoded output data are then temporarily held in an output data buffer 7 before being outputted to an output terminal 8, to be transmitted to a corresponding decoding apparatus or to be recorded on a recording medium.

The output values from the quantizer 5 are also supplied to a dequantizer 9, whose output is connected to an inverse orthogonal transform section 10, which thereby execute inverse orthogonal transform processing and dequantization to decode each frame in the same manner as is executed in a corresponding decoding apparatus which receives the output data from the output terminal 8. The output values from the inverse orthogonal transform section 10 are applied to one input of an adder 11, whose output is supplied to a frame memory 12 and written therein. Data in the frame memory 12 are read out and supplied to the other input of the subtractor 2, and also to the other input of the adder 11.

An overflow indication signal that is produced from the output data buffer 7, in accordance with whether or not the contents of the output data buffer 7 are approaching an overflow condition, is supplied to a control input terminal of the quantizer 5, and also to one input terminal of a signal combining circuit 16, which produces a filter degree control signal for controlling a degree of filtering that is applied by the spatial filter 3 as described hereinafter. This overflow indication signal from the output data buffer 7 serves to control the quantization threshold level of the quantizer 5, i.e. the quantization step size, as well as the degree of filtering that is applied by the spatial filter 3.

The input video signal is also supplied to a synchronizing signal separator circuit 14, which extracts a synchronizing signal component which is inputted to control the timing of operation of a control signal generating circuit 15. The control signal generating circuit 15 produces various control signals for controlling write and read operations of the input memory 1a and frame memory 12, and also a frame signal which varies peridically with a period that is an integral number of frame intervals, for controlling periodic switching of the degree of filtering provided by the spatial filter 3. This frame signal is combined with the overflow indication signal from the output data buffer 7 in the combiner circuit 16, which thereby derives the filter degree control signal that is applied to the spatial filter 3. In this embodiment as described hereinafter the spatial filter 3 is thereby periodically switched in units of frame intervals between a condition in which filtering is executed and a condition in which no filtering is executed, i.e. to switch filtering on and off in alternate frame intervals of the data read out from the input memory 1a.

The configuration and operation of such a recursive inter-frame predictive encoding apparatus, other than for the spatial filter 3 which is coupled to receive prediction error values produced from the subtractor 2, are known in the prior art. However in the prior art, a spatial filter may be connected to filter the prediction signal that is applied to the second input of the subtractor 2 (from the frame memory 12). Such filter operation is basically different from that of the embodiment of FIG. 2, in which the prediction error values produced from the subtractor 2 are filtered before being encoded and transmitted. It is desirable to reduce the high frequency components of the input data values applied to the orthogonal transform section 4, to thereby produce a corresponding reduction in the amount of encoded data that are outputted from the apparatus. However in such a recursive inter-frame predictive encoding apparatus, if the high frequency components of the prediction error values representing all of the frames were to be eliminated, this would result in a significant lowering of resolution of the picture obtained by decoding the output data from the apparatus. With this embodiment, this problem is overcome by executing filtering in a periodic manner, in units of frame intervals or multiples of frame intervals. It will be assumed that the spatial filter 3 is set in a fully operational state (in which a specific degree of elimination of the high frequency components of the prediction error values from the subtractor 2 occurs) and in a non-operational state (no filtering executed) on alternate frame intervals of the video signal. This switching of the filter operation is controlled by the frame signal from the control signal generating circuit 15.

The output values from the spatial filter 3 are converted by the orthogonal transform section 4 to coefficient component values by an orthogonal transform operation, such as the discrete cosine transform (DCT), in units of blocks, for example blocks of 8×8 values. The resultant output signal from the orthogonal transform section 4 is then quantized by the quantizer 5. Since the distribution of the resultant quantized signal is close to zero amplitude, encoding efficiency is further increased by encoding the output values from the quantizer 5 in the variable-length encoder 6 using a variable-length encoding technique, such as Huffman encoding. The resultant variable-length code data are then transferred through an output data buffer 7 to the output terminal 8.

An overflow indication signal is produced from the output data buffer 7, on an output line 7a, which varies in accordance with a degree to which the output data buffer 7 is approaching the overflow condition. In the prior art it has only been possible to reduce the data rate of the output data of such a recursive inter-frame predictive encoding apparatus by increasing the step size used by the quantizer 5, i.e. increasing the quantization threshold level. However if more than a moderate increase in the threshold level beyond the optimum level is executed, this will result in block distortion, causing marked deterioration of the finally obtained display picture. With the present invention, however, the output encoded data rate can also be controlled by means of the spatial filter 3, i.e. by controlling the degree of filtering that is applied by the spatial filter 3. Specifically, as described in detail hereinafter, the spatial filter 3 actually contains a spatial filter in combination with a circuit for controllably varying a degree of bypassing the filter, i.e. a control signal applied to the spatial filter 3 can control the degree of filtering between a condition in which the output from the spatial filter 3 consists entirely of the output signal from that internal spatial filter, and a condition in which the output signal from the spatial filter 3 consists of the input signal applied thereto, with the internal spatial filter entirely bypassed. The resultant variable-length data are supplied to an output terminal 9, to be transmitted to a corresponding decoding apparatus, or to be recorded and subsequently played back and supplied to a corresponding decoding apparatus.

It has been found that optimum control of the output encoded data rate is achieved by using a combination of varying the quantization step size and varying the degree of filtering of the spatial filter 3, so that the output control signal from the output data buffer 7 is also supplied to the quantizer 5 for controlling the quantization threshold level.

Thus with this embodiment there are two forms of control of the spatial filter 3 which may be applied together, i.e. continuously variable control of the degree of filtering by the output signal from the output data buffer 7, and switching of the degree of filtering on alternate frames by a control signal from the control signal generating circuit 15. This switching occurs between a degree of filtering of zero (complete bypass) and a degree of filtering that is determined by the control signal from the output data buffer 7. This could be arranged in practice by using the control signal from the control signal generating circuit 15 to control a switch within the combining circuit 16 to selectively transfer the control signal from the output data buffer 7 to the spatial filter 3.

With this embodiment, since the prediction error values for one out of every two frames of the video signal are encoded and transmitted without any reduction of the high frequency components, there will be only a slight or insignificant lowering of resolution of the finally obtained display picture as a result of eliminating the high frequency components of the intermediate frames. Thus, a substantial reduction of the data rate of the encoded output signal can be achieved by this elimination of high frequency components of the prediction error signal.

In addition the output data rate from the apparatus is controlled, when the output data buffer 7 reaches an overflow condition, by varying the degree of filtering that is produced by the spatial filter 3, or by a combination of varying the degree of filtering and varying the threshold level of the quantizer 5. In this way the output data rate can be effectively controlled to prevent output buffer overflow, without the danger of block distortion being introduced.

Figure 3:
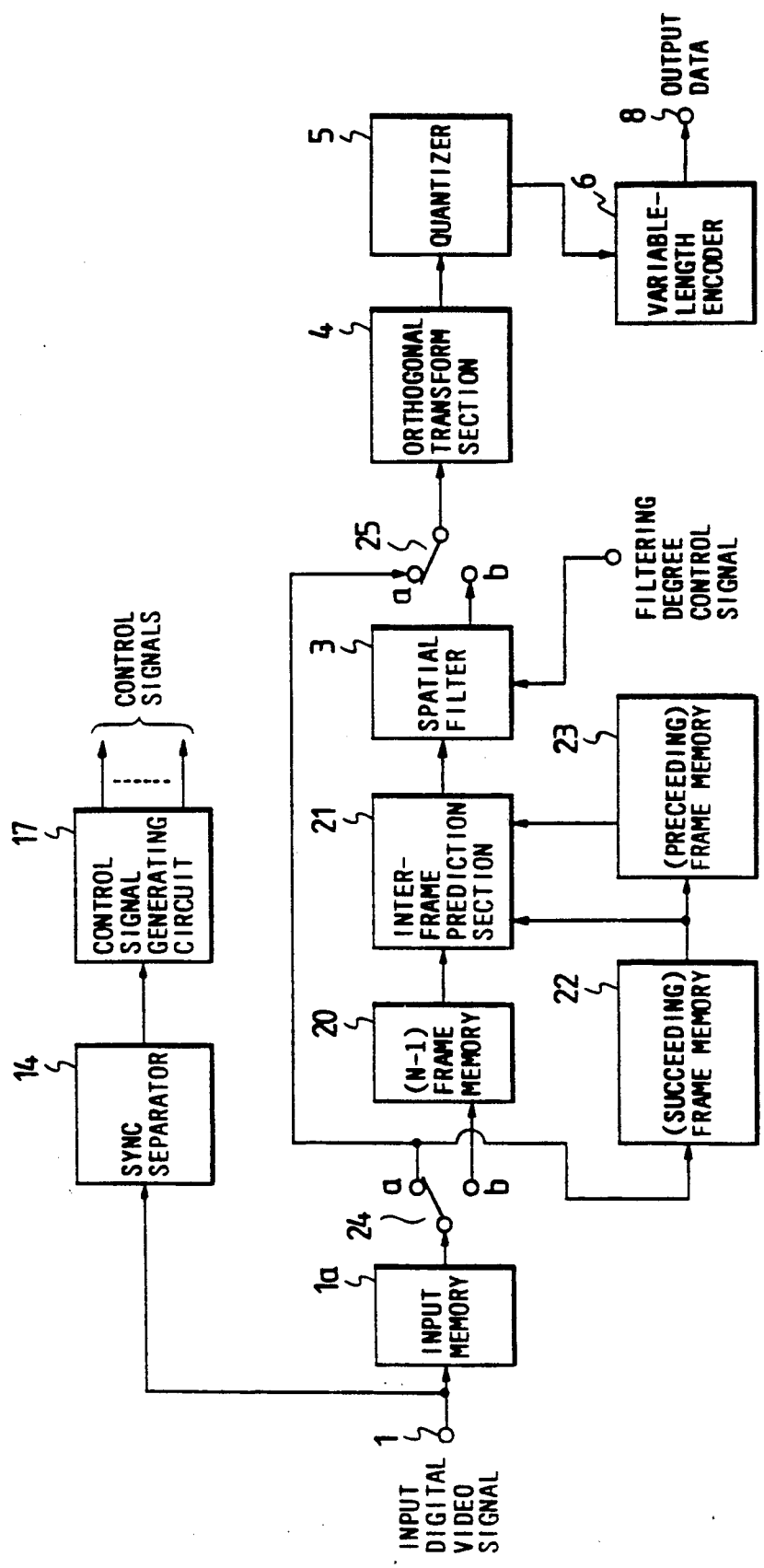
FIG. 3 is a general block diagram of a second embodiment of an inter-frame predictive encoding apparatus according to the present invention.

FIG. 3 is a general block diagram of a second embodiment of an inter-frame predictive encoding apparatus according to the present invention. Except for incorporation of a spatial filter 3, this embodiment is identical to embodiments described in FIGS. 7 and 8 of the aforementioned U.S. Pat. No. 4,985,768 by the assignee of the present invention. An input video signal is transferred through an input memory 1a, as in the preceding embodiment, to the movable contact of a changeover switch 24. the "a" fixed contact of the changeover switch 24 is connected to the "a" fixed contact of a changeover switch 25, which executes switching between the "a" and "b" contacts in synchronism with the changeover switch 24. The "b" fixed contact of the changeover switch 24 is connected to the input of a (N−1) frame memory 20, which has a memory capacity of (N−1) frames and is used to produce a delay of N frame intervals between input of a frame of the video signal thereto and subsequent readout of the frame, where N is a fixed integer. The output of the (N−1) frame memory 20 is connected to an input of a interframe predictive section 21, whose output is supplied to a spatial filter 3 as a prediction error signal. The output of the spatial filter 3 is connected to the "b" fixed contact of the changeover switch 25. The movable contact of the changeover switch 25 is connected to the input of a orthogonal transform section 4, with the output coefficient values produced from the orthogonal transform section 4 being quantized by a quantizer 5 and then encoded by a variable-length encoder 6 to be supplied to an output terminal 8 as in the preceding embodiment.

The "a" fixed contact of the 24 is also connected to the input of a (succeeding) frame memory 22, and data read out from the (succeeding) frame memory 22 are written into a (preceding) frame memory 23 and also supplied to an input of the inter-frame predictive section 21. Data values read out from the (preceding) frame memory 23 are supplied to another input of the inter-frame predictive section 21.

As in the preceding embodiment, the input video signal is also supplied to a synchronizing signal separator circuit 14 which extracts a synchronizing signal component, to be inputted to a control signal generating circuit 17. The control signal generating circuit 17 produces various control signals for controlling write and read operations of the input memory 1a, (succeeding) frame memory 22 and (preceding) frame memory 23, and also controls switching operations of the changeover switch 24 and changeover switch 25 such that the output of the input memory 1a is supplied directly to the orthogonal transform section 4 and to the (succeeding) frame memory 22 during one frame interval, once in every N successive frame intervals, and is otherwise supplied to the (N−1) frame memory 20.

Figure 1:
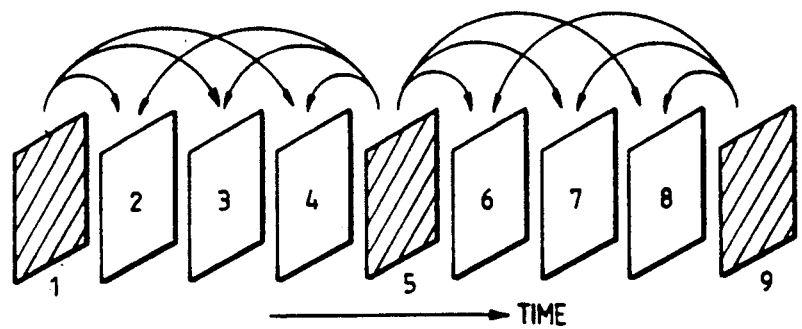
FIG. 1 is a conceptual timing diagram for describing a method of deriving prediction error values based on inter-frame correlation along both directions of the time axis.

The basic operation of this embodiment is as illustrated in FIG. 1. Each time that the output of the input memory 1a is supplied to the changeover switch 25, one frame of the video signal is subjected to orthogonal transform processing, quantization and variable-length encoding, to be transmitted as encoded output from the output terminal 8. Such frames will be referred to as independent frames, these being indicated by the crosshatched rectangles 1, 5, 9 in FIG. 1. For each of the dependent frames 2, 3, 4, 6, 7, 8 etc., only prediction error values are derived using the independent frames as reference frames, by the inter-frame predictive section 21. These prediction error values are then filtered by the spatial filter 3, and then subjected to the orthogonal transform, quantization and encoding processing of the orthogonal transform section 4, quantizer 5 and variable-length encoder 6 to be transmitted as encoded data from the output terminal 8. That is, as indicated by the arrows in FIG. 1, each frame occurring between two successive independent frames is subjected to inter-frame predictive encoding based on these two independent frames. For example, inter-frame predictive encoding of frame 2 is executed based on the independent frames 1 and 5. Specifically, a first prediction signal is derived based on frame 1 as a reference frame, and a second prediction signal for frame 2 is derived based on frame 5 as a reference frame. These two prediction signals are multiplied by respective weighting factors and combined to obtain a final prediction signal, with the weighting factors being determined by the position of the dependent frame, e.g. the position of frame 2 with respect to the independent frames 1 and 5. The prediction signal thus obtained, i.e. successive prediction values, are subtracted from the corresponding data values of frame 2, to obtain prediction error values of that frame, which are outputted from the inter-frame predictive section 21 and filtered by the spatial filter 3 to remove part of the high frequency components of these prediction error values. Each time a new independent frame is encoded and transmitted, that frame is written into the (succeeding) frame memory 22 while the frame that was previously held in the (preceding) frame memory 23 is replaced by the previous contents of the (succeeding) frame memory 22. In this way, the (succeeding) frame memory 22 and (preceding) frame memory 23 always contain a succeeding and preceding independent frame for use in processing each dependent frames which occur between these independent frames.

Prediction error values for the other dependent frames are similarly derived, and these are successively encoded and transmitted. Since in this case correlation between a preceding independent frame and a succeeding independent frame is utilized to obtain prediction error values for each dependent frame, a substantially greater degree of accuracy of prediction is attained than is possible with prior art methods in which only inter-frame correlation along the forward direction of the time axis is utilized.

With this method, only prediction error values are encoded to represent each of the dependent frames, and these prediction error values are not subsequently utilized to derive new prediction error values (as is done with the recursive type of inter-frame predictive encoding apparatus of FIG. 2). On the other hand, the independent frames are not transferred through the spatial filter 3, so that the high frequency components of these frames are available to the decoding apparatus when the dependent frames are recovered by using the prediction error values. It is thus possible to substantially entirely remove the high frequency components of the prediction error values of all of the dependent frames by the spatial filter 3, without seriously affecting the resolution of the finally obtained picture, i.e. to apply a preset fixed-value control signal to the spatial filter 3 as indicated in FIG. 3, for determining the degree of filtering applied to the prediction error values. The actual degree of filtering that is used, i.e. the level of the degree of filtering control signal applied to the spatial filter 3, is determined (in conjunction with the threshold level that is set for the quantizer 5) such as to establish a desired data rate for the output encoded data from the apparatus. The greater the degree of filtering, the lower will be the amount of high frequency components of the prediction error values that are encoded and transmitted and hence the lower will be the overall output data rate. In addition, this reduction of high frequency components will result in a reduction of the level of quantization noise in the output encoded data.

It would however also be possible to switch the degree of filtering of the spatial filter 3, e.g. for alternate ones of the dependent frames, in a similar manner to that described above for the embodiment of FIG. 2, i.e. so that little or no filtering is applied to the prediction error values of some of the dependent frames, and a high degree of filtering applied to the remaining dependent frames. This may enable an increased degree of spatial resolution to be achieved, by comparison with employing a fixed degree of filtering.

Figure 4:
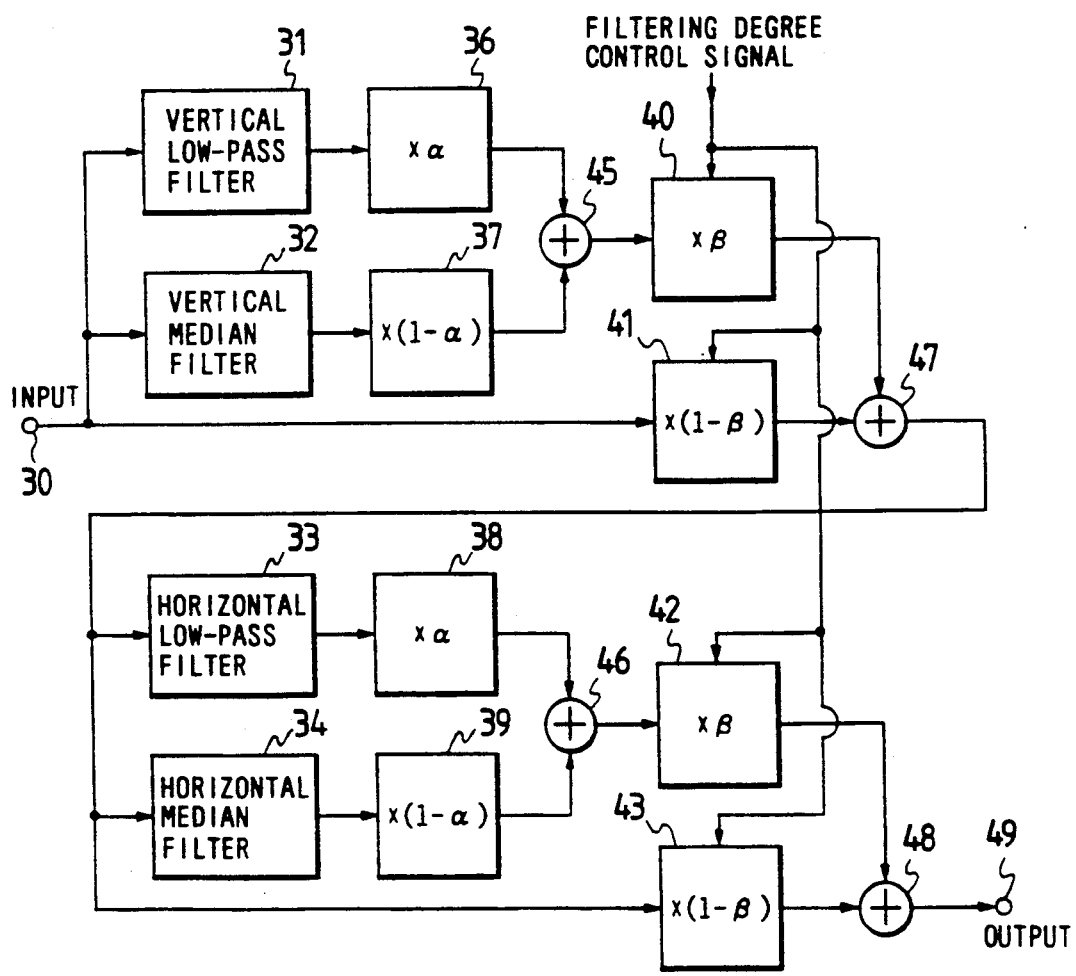
FIG. 4 is a block diagram of a spatial filter used in the embodiments of FIGS. 2 and 3.
Figure 5:
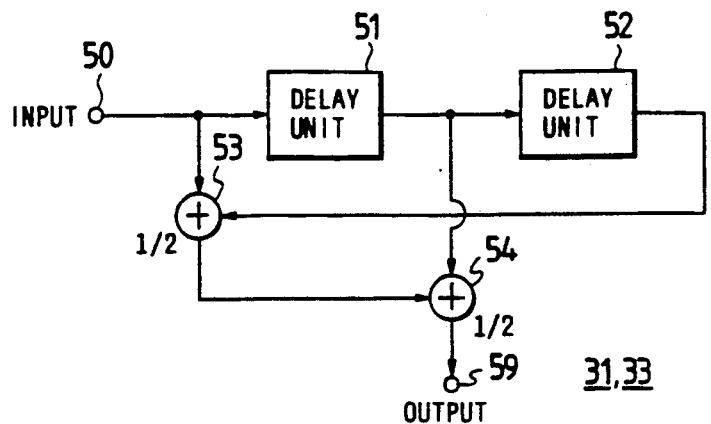
FIGS. 5 and 6 are block diagrams of filter circuits within the spatial filter of FIG. 4.
Figure 6:
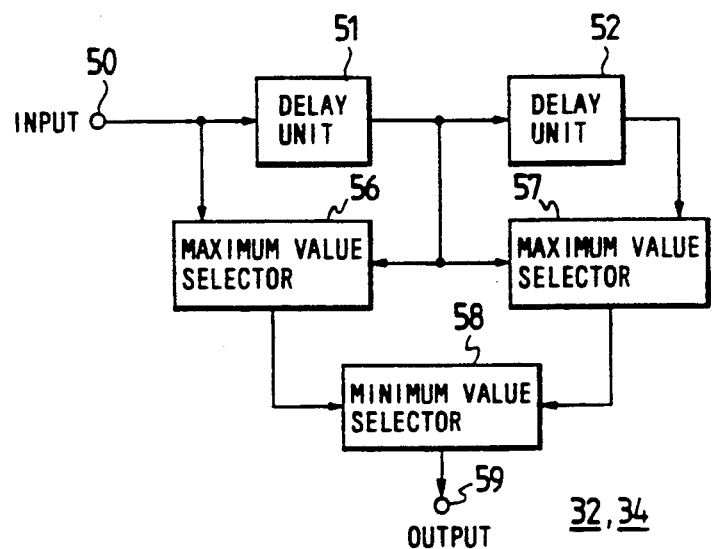

FIG. 4 is a block diagram showing an example of a spatial filter for use as the spatial filter 3 in the above embodiments. This executes mutually independent processing in the vertical and horizontal directions of the frame. In this example, vertical filtering is executed first, followed by horizontal filtering, however it would be equally possible to use the opposite arrangement. The spatial filter utilizes a usual type of digital low-pass filter and median filter. In FIG. 3, an input signal is applied to input terminal 30, to be respectively inputted to a vertical low-pass filter 31 and a vertical median filter 32. FIG. 5 shows an internal configuration which is used in common for the vertical low-pass filter 31 and also for a horizontal low-pass filter 33 described hereinafter. FIG. 6 shows an internal configuration which is used in common for the vertical median filter 32 and also for the horizontal median filter 34, also described hereinafter. In FIGS. 5 and 6, numeral 51 denotes respective delay units. Since filter operation is executed in units of blocks, each of these provides a delay that is equal to the period of one row of a block (e.g. 8 sample periods, for an 8×8 block size) in the case of a vertical filter, and a delay of one sample period in the case of a horizontal filter. These diagrams show only the most basic configurations for the median filters and low-pass filters, whereby each low-pass filter provides a raised cosine form of filter characteristic, while each median filter has a characteristic function such that for every three successive data samples (in this case, prediction error values) that are inputted thereto, only the one of these three which is intermediate in magnitude between the other two will be outputted from the filter.

In the case of the low-pass filter of FIG. 5, the input terminal 50 is connected to the input terminal of a delay unit 51 and to one input terminal of an adder 53. The output terminal of the delay unit 51 is connected to the input terminal of a delay unit 52, and to one input terminal of an adder 54. The output terminal of the delay unit 52 is connected to the other input terminal of the adder 53, while the output terminal of the adder 53 is connected to the other input terminal of the adder 54. The output terminal of the adder 54 is connected to the signal output terminal 59.

Each of the adders 53, 54 derives the sum of two input values applied thereto, divides the sum in half, and outputs the result.

In the case of the median filter of FIG. 6, the output terminal 50 is connected to respective input terminals of a delay unit 51 and a maximum value selector 56. The output terminal of the delay unit 51 is connected to the input terminal of a delay unit 52, to another input terminal of the maximum value selector 56, and to an input terminal of a maximum value selector 57. The output terminal of the delay unit 52 is connected to the other input terminal of the maximum value selector 57, while the output terminal of the maximum value selector 56 is connected to one input terminal of a minimum value selector 58. The output terminal of the maximum value selector 57 is connected to the other input terminal of the minimum value selector 58, and the output terminal of the minimum value selector 58 is connected to a signal output terminal 59.

Figure 7A:
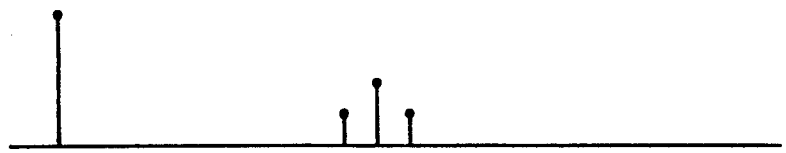
FIGS. 7A and 7B are diagrams showing examples of filter processing operation.

FIGS. 6A, 6B show respective results of processing by such filter. In FIGS. 6A, 6B, movement along the horizontal direction of a frame, in the case of a horizontal filter (or movement along the vertical direction of a frame, in the case of a vertical filter) is plotted along the horizontal axis. Input signal level (i.e. prediction error value magnitude) is plotted along the vertical axis. In the case of horizontal filtering, FIG. 7A illustrates the case in which a single isolated prediction error value having the magnitude shown occurs (or occurs as part of two or more of such values which extend along a vertical line in the frame), e.g. corresponding to one isolated pixel or to a vertical line of pixels. In the case of vertical filtering on the other hand, FIG. 7A illustrates the case in which a single isolated prediction error value having the magnitude shown occurs (or occurs as part of a set of such prediction error values extending along a single scan line). As shown, substantially lower-amplitude resultant output values are produced from the horizontal or vertical low-pass filter in such a case, while zero output is produced from the horizontal or vertical median filter.

Figure 7B:
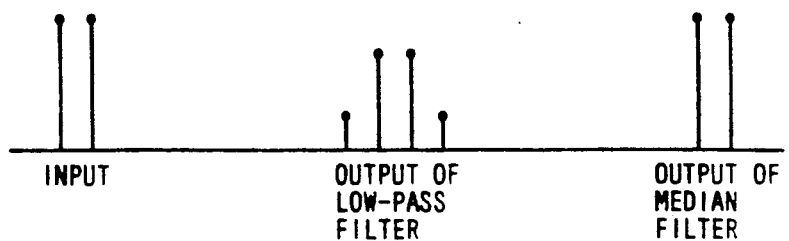

In the case of horizontal filtering, FIG. 7B illustrates the case in which a pair of adjacent prediction error values (e.g. corresponding to two successive pixels along a scan line) occur, or when two mutually adjacent vertical lines of such prediction error value values occur. In the case of vertical filtering, FIG. 7B illustrates the case in which two isolated vertically adjacent prediction error values having the magnitude shown occur in two successive scan lines (or two adjacent sets of such prediction error values extending along two successive scan lines). As shown, there is little attenuation produced by the low-pass filter in such a case, and no attenuation produced by the median filter.

In this way, these filters serve to eliminate prediction error values which correspond to isolated very small regions or to thin lines in the spatial domain. On the other hand, where prediction errors extend over larger areas of a frame, the prediction errors are transferred without attenuation by the filters. Such filter provide more effective attenuation of high frequency components of the prediction error signal than can be obtained by using linear filters. In the case of actual thin lines which form part of a picture conveyed by a frame, however, due to the phase relationships between the timings of the input signal data values (samples), the effects of the filters will be a mixture of the effects illustrated in FIGS. 7A and 7B, so that such thin lines will appear to flicker in and out, in a finally derived display picture. This effect can be substantially reduced by using the basic filter circuits of FIGS. 5 and 6 in combination with respective linear filters.

The respective outputs from the vertical low-pass filter 31 and vertical median filter 32 are multiplied by respective weighting values $\alpha$ and $(1-\alpha)$ by the multipliers 36 and 37, with the resultant signals being combined in an adder 45, where $0 \leq \alpha \leq 1$. A value of $\frac{1}{2}$ will generally be suitable for $\alpha$. Similarly, the respective outputs from the horizontal low-pass filter 33 and horizontal median filter 34 are multiplied by the respective weighting values $\alpha$ and $(1-\alpha)$ by the multipliers 38 and 39, with the resultant signals being combined in an adder 46.

The degree of filtering of the spatial filter is determined by a factor $\beta$, which is applied in the multipliers 40 and 41 for the vertical filter and by the multipliers 42 and 43 for the horizontal filter, where $0 \leq \beta \leq 1$. The vertical filter output signal from the adder 45, and the input signal from terminal 30 are respectively multiplied by $\beta$ and by $(1-\beta)$ in the multipliers 40 and 41, and the outputs from these are combined in the adder 47. The operation of the horizontal filter section is identical to that of the vertical filter, with the only difference being the changed values of the delays produced by the delay units 52, 53. The output signal from the adder 47 is supplied to the horizontal low-pass filter 33 and horizontal median filter 34 respectively, and the respective outputs from these are multiplied by $\alpha$ and by $(1-\alpha)$ in the 38, 39, with the outputs from these being combined in the adder 46. The output signal from the adder 46, and the output signal from the adder 47 are respectively multiplied by $\beta$ and by $(1-\beta)$ in the multipliers 42 and 43, and the outputs from these are combined in the adder 48.

As a result, when $\beta$ is made equal to 1, the maximum degree of filtering is achieved, while if $\beta$ is made equal to 0 the degree of filtering becomes zero, i.e. both the horizontal and vertical filters of the spatial filter are completely bypassed and the input signal of input terminal 30 transferred to the output terminal 49 without change.

It should be noted that when such a spatial filter is used in an inter-frame predictive encoding apparatus in which processing such as motion compensation or prediction error value derivation is executed in units of blocks which are successively extracted from a frame, i.e. such that the inter-frame predictive operation may differ from block to block, the filter operation must also be in units of blocks. This is due to the fact that if the predictive operation differs between respective blocks, the prediction errors will be discontinuous, so that if the block structure were to be ignored in inputting data values to the spatial filter, block distortion would occur.

In addition, since this is a digital filter and the number of pixel values constituting each row and column of the block is small (e.g. 8), it is necessary to control the operation of the filter such as to prevent erroneous results being obtained when values are inputted which are at or close to the end or beginning of a block row or column, i.e. corresponding to pixel positions along the edges or at the corners of the block. Specifically, it is necessary to vary the filter coefficients in accordance with whether an error value that is currently being inputted to the filter corresponds to an outer edge or corner position of the block or is positioned in the interior of the block. In the case of the simple low-pass filter of FIG. 5 for example, this could be done by inhibiting some or all of the inputs to the adders 53, 54 in accordance with the block position of an error value that is currently being inputted. In practice, this could be arranged, for example, by using a counter to count a number of error values that have been inputted to the filter for the current block, and to execute control of inhibit gates on the basis of the count values.

Such considerations of filter coefficients for spatial filtering of such blocks of pixel data are described in the CCITT of International Telecommunication Union, Document #396, October 1988 document "Description of Ref. Model 6 (RM6)", page 22, concerning a related application of a spatial low pass filter.

When such a spatial filter is used to remove high frequency components of the prediction error values in a recursive type of inter-frame predictive encoding apparatus, as in the embodiment of FIG. 2, the resolution of the finally obtained picture would be degraded if the high frequency components were to be removed from the prediction error values transmitted for all of the frames, since of course no high frequency information could be decoded and recovered. For that reason, it is necessary to execute periodic switching of the degree of filtering of the spatial filter to zero in units of frame intervals in such a case, as described above for the first embodiment. If that is done, then the resolution of a frame that is recovered by using filtered prediction error values will not be significantly different from that of a preceding or succeeding frame which has been recovered by using non-filtered prediction error values.

In the case of an inter-frame predictive encoding apparatus in which all of the original data of certain frames (i.e. independent frames) are encoded and transmitted periodically, with dependent frames being represented by prediction error values derived using the independent frames as reference frames as in the second embodiment of the invention, it is possible to apply spatial filtering to the prediction signals of all of the dependent frames, to substantially eliminate high frequency components of these frames, without causing excessive lowering of resolution of the finally obtained picture, since reference high frequency data are contained in the independent frames. However it may be possible to obtain an improved degree of picture resolution if the degree of filtering of the spatial filter 3 is periodically switched, in units of frames, as is done for the first embodiment, i.e. with filtering being removed for every other frame. This will however result in an increase in the transmitted data rate.

In addition to controlling the spatial filter operation by switching between a fixedly predetermined degree of filtering and zero filtering, it is also possible to adjust the value of such as to reduce the transmitted data rate of the inter-frame predictive encoding apparatus to a desired degree, by reducing the amount of high frequency components that are encoded and transmitted. In the case of the second embodiment, this is done by applying a preset fixed control signal to the spatial filter 3, to set the data rate of the encoded output data from the inter-frame predictive encoding apparatus to a suitable value. In the case of the first embodiment, a control signal produced from the output data buffer 7 on output line 7a varies in accordance with a degree of overflow of the output data buffer 7. This control signal is combined with a timing control signal from the control signal generating circuit 15 which varies in units of frames (e.g. goes to the logic H and L levels in alternate frame intervals). In this way the operation of the spatial filter 3 alternates in successive frames between a condition in which filtering of the prediction error values is executed using a degree of filtering that is determined by the control signal produced from the output data buffer 7, and a condition of no filtering being applied.

In this way the requirement for ensuring satisfactory resolution of the finally obtained picture, by encoding and transmitting the high frequency components of prediction error values representing alternate frames of the input video signal, is satisfied while in addition, optimum control of the output data rate such as to prevent buffer overflow is executed, by controlling the quantization step size of the quantizer 5 in conjunction with controlling the degree to which high frequency filtering is applied to the prediction error values representing the other frames of the input video signal. This enables effective control of the output encoded data rate without the danger of block distortion and consequent degradation of the finally obtained picture.

What is claimed is:

1. In an inter-frame predictive encoding apparatus for receiving a video signal formed of successive frames of pixel data, to derive, for each of said frames, a prediction error signal based on differences between pixel data of the frame and pixel data of at least one other frame, the improvement comprising:

spatial filter means for filtering said prediction error signal to alter a frequency characteristic thereof;

filter control means responsive to a filter degree control signal for varying a degree of said filtering, and means for periodically varying said filter degree control signal with a period which is an integral number of frame intervals, for alternately establishing a first condition in which substantially no filtering is executed by said spatial filter means and a second condition in which a fixed degree of filtering is executed by said spatial filter means.

2. In an inter-frame predictive encoding apparatus for receiving a video signal formed of successive frames of pixel data, to derive, for each of said frames, a prediction error signal based on differences between pixel data of the frame and pixel data of at least one other frame, the improvement comprising:

spatial filter means for filtering said prediction error signal to alter a frequency characteristic thereof; and filter control means responsive to a filter degree control signal for varying a degree of said filtering, in which said filter degree control signal is preset to a fixed value which is selected to provide a desired output encoded data rate from said inter-frame predictive encoding apparatus.

3. In an inter-frame predictive encoding apparatus for receiving a video signal formed of successive frames of pixel data, to derive, for each of said frames, a prediction error signal based on differences between pixel data of the frame and pixel data of at least one other frame, the improvement comprising:

spatial filter means for filtering said prediction error signal to alter a frequency characteristic thereof; and filter control means responsive to a filter degree control signal for varying a degree of said filtering, in which said inter-frame predictive encoding apparatus comprises an output data buffer through which are transferred encoded output data, said output data buffer generating an overflow indication signal indicative of a degree of overflow of said output data buffer, and further comprising means for generating a frame signal which periodically varies with a period that is an integral number of frame intervals, and means for combining said frame signal with said overflow control signal and applying a resultant combined signal as said filter degree control signal.

4. The improvement according to claim 3, in which said inter-frame predictive encoding apparatus includes quantizer means for quantizing encoded data resulting from said intra-frame encoding, and in which said overflow control signal is further applied to control a quantization step size of said quantizer means.

5. In an inter-frame predictive encoding apparatus for receiving a video signal formed of successive frames of pixel data, including means (2, 11, 12) for deriving, for each of said frames, a prediction error signal based on differences between pixel data of the frame and pixel data of at least one other frame, encoding means for encoding the video signal subject to the prediction error signal and means for outputting encoded video signal, the improvement comprising:

a structural configuration for reducing high frequency components of input data values applied to said encoding means thereby to reduce an amount of encoded data outputted by the apparatus, the configuration including spatial filter means for filtering said prediction error signal to alter a frequency characteristic thereof; and, filter control means responsive to a filter degree control signal for varying a degree of said filtering thereby to avoid lowering resolution of an image represented by the outputted encoded video signal.

6. An improved predictive encoding apparatus according to claim 5, wherein said spatial filter means is connected in a signal path between said means for deriving and said encoding means for providing the filtered prediction error signal to said encoding means.

7. An improved predictive encoding apparatus according to claim 5, wherein said spatial filter means is connected in a signal path for providing a prediction signal to said encoding means and said filter control means comprises means for alternately connecting and bypassing said spatial filter means between said means for deriving and said encoding means.

* * * * *